United States Patent
Kato

(10) Patent No.: US 7,562,595 B2
(45) Date of Patent: Jul. 21, 2009

(54) DUST PROOF SLIDING DEVICE

(75) Inventor: Masataka Kato, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 736 days.

(21) Appl. No.: 11/085,081

(22) Filed: Mar. 22, 2005

(65) Prior Publication Data

US 2005/0252319 A1  Nov. 17, 2005

(30) Foreign Application Priority Data

May 11, 2004  (JP) ............................ 2004-140562

(51) Int. Cl.
  *F16H 19/02* (2006.01)
  *F16C 29/08* (2006.01)
  *B65G 69/18* (2006.01)
(52) U.S. Cl. .................. 74/89.4; 74/89.41; 74/89.23; 198/494; 198/495
(58) Field of Classification Search ............. 74/89.23, 74/89.33, 89.4, 89.41; 198/494, 495
  See application file for complete search history.

(56) References Cited

U.S. PATENT DOCUMENTS

| | | | | |
|---|---|---|---|---|
| 3,554,360 A | * | 1/1971 | Bildsoe | 198/833 |
| 3,878,937 A | * | 4/1975 | Glaser et al. | 198/835 |
| 3,916,572 A | * | 11/1975 | Coes, Jr. | 451/256 |
| 5,460,059 A | * | 10/1995 | Kato | 74/89.22 |
| 6,344,718 B1 | * | 2/2002 | Nagai et al. | 318/14 |
| 6,571,932 B1 | * | 6/2003 | Kawashima et al. | 198/494 |
| 2003/0098551 A1 | * | 5/2003 | Kato | 277/650 |

FOREIGN PATENT DOCUMENTS

| | | |
|---|---|---|
| JP | 1996-290384 | 5/1998 |
| JP | 1997-144830 | 12/1998 |
| JP | 2003-222129 | 8/2003 |

* cited by examiner

*Primary Examiner*—Richard W L Ridley
*Assistant Examiner*—Thomas Diaz
(74) *Attorney, Agent, or Firm*—Browdy and Neimark, P.L.L.C.

(57) ABSTRACT

A sliding device for use with a variety of machines is reduced in overall length, thereby being compact in construction. The sliding device has a drive train enclosure made airtight and is acceptable for use in a clean environment. The sliding device includes an elongated sliding unit enclosure of airtight construction, a sliding table and a driving motor that is coupled to the drive train enclosure in parallel with the sliding unit enclosure. The drive train enclosure receives a drive train to carry power from the driving motor to the sliding table. The drive train enclosure is mounted with the driving motor while maintaining airtightness.

1 Claim, 7 Drawing Sheets

DUST PROOF SLIDING DEVICE

FIELD OF THE INVENTION

The present invention relates to a dust proof sliding device causing little dust, which is comprised of an elongated sliding unit enclosure made in airtight construction with sealing members, a sliding table movable along the sliding unit enclosure and a driving motor actuating the sliding table.

BACKGROUND OF THE INVENTION

There have been conventionally known the sliding devices of a completely enclosed type that is adapted for use in the semiconductor manufacturing machines, machine tools, assembly machines, testing machines, and so on, which are needed to operate in the clean rooms. A prior sliding device of the type stated earlier is disclosed in, for example Japanese Patent Laid-Open No. 2003-222129, in which sealing members of foam rubber fit in seal holders that are each made up of a seal support portion and a cover portion integral with the seal support portion, the seal holders being attached at their cover portions onto widthwise opposite sides of a guide rail. The sealing member is made of porous material rich in flexibility and restoration to its original state. The sealing members fit into recesses in the seal support portions in opposition to each other to come into abutment against one another, thereby close a clearance between the seal support portions of the seal holders. The slider has a table extending through between the opposite sealing members to the outside to carry any object thereon. As the slider travels in the lengthwise direction of the guide rail, the table moves with getting deforming the sealing members, but keeping close sliding-contact with the sealing members. With the sliding device constructed as stated earlier, the clearance between the opposite seal holders is kept closed constantly while the slider travels. Thus, the sliding device is better for clean environment as well as improved in durability and dust-proofing property, even with slim in construction.

A linear motion actuator causing little dust is disclosed in, for example Japanese Patent Laid-Open No. H8-290384, in which a driving motor is arranged side by side with a linear motion guide unit encased within an enclosure. The driving motor is also enclosed in a container reduced in pressure below the atmosphere to keep any airborne dust against going away into the atmosphere. A seal belt is jointed at one end thereof with any one end of a carriage and at another end thereof with another end of the carriage to be brought in endless form. The seal belt fits over pulleys at forward and aft ends inside the enclosure in a way closing a lengthwise slit. There are provided tubes made opened near axially opposite ends inside the enclosure to bleed the enclosure of air. The bleeder tubes serve effective function to purge air that is raised in pressure at the axially opposite ends as the carriage reciprocates with high velocity, thereby keeping any dust against going away out of the atmosphere.

A movable table unit is disclosed in, for example Japanese Patent Laid-Open No. H9-144830, in which a driving source lies side by side with a lead screw. The prior movable table unit is composed of a lead screw to connect a driving source to a table carried on a guide rail, and a nut fastened to the table. This prior table unit does away with a support frame to shrink the unit down. With the movable table unit recited above, the lead screw is born against a support plate attached to any one end of the guide rail while the driving source is mounted on the support plate with using a bracket. The table unit is secured to any other object along the guide rail.

Nevertheless, the sliding device as first recited earlier has a constructional issue that as the driving motor is installed in tandem with the guide rail in a relation an output shaft of the motor lies generally on the extension of an axial line of a lead screw, the sliding device is too large in the overall length inclusive of both the lead screw and the driving motor to use it in the appliance constrained in lengthwise dimension. Making the sliding device shorten in overall axial length, thus, was a major challenge for this sort of sliding unit.

With the linear motion actuator second recited earlier in which the lengthwise clearance slit into the enclosure is closed with the seal belt made in the endless form fit over four pulleys, it was needed to collect airborne dust inside the enclosure through some air bleeder tubes and further enclose entirely the driving motor with any other covering material. With this type of linear motion actuator constructed as stated earlier, any airtight packing has to be applied at the junction of the enclosure with the motor covering. Thus, problems faced in the linear motion actuator recited earlier are that the actuator unit by itself has to be made large scale in construction and further that the actuator unit is tougher for installation in a posture easy to operate it.

With the movable table unit third recited earlier, top and side covers are disposed between the bracket and the support plate while the driving source is shielded together with the coupler by using a covering and also a drive train is enclosed with another covering. The lead screw extends outside the covering and ends in a manipulator. Considering the construction as stated just above, this prior table unit has no technical concept of the provision of airtight construction and therefore is envisaged usage in the clean environment.

SUMMARY OF THE INVENTION

The present invention, therefore, has as its principal object to overcome the problems stated earlier and, in particular, to provide a sliding device constructed to cause little dirt and dust, which is extensively acceptable for standard specifications and is comprised of a main sliding unit enclosure encasing therein a guide rail and a slider traveling relatively to the guide rail, a driving motor arranged side by side with slider enclosure, and a drive train enclosure containing therein a part of drive train to connect the main sliding unit enclosure with the driving motor. The major concept of the present invention is to provide the sliding device adapted for use in clean atmosphere with high accuracy as well as long-lasting durability because the sliding components, driving source and drive train are all enclosed in airtightness with the simple combination of the sliding unit enclosure and the drive train enclosure. Another concept of the present invention is to provide a sliding device that is made reduced in the overall length to make it possible to install the device in the site constrained in lengthwise dimension. Another concept of the present invention is to provide the sliding device in which the driving motor can be easily redirected in geometric relation with the sliding unit in site to customize the device in compliance with user's application and usage. Making the sliding unit shorter in overall axial length while maintaining airtightness, thus, was a major challenge for this sort of sliding device.

The present invention is concerned with a sliding device; comprising an elongated sliding unit enclosure made airtight with sealing members, a sliding table movable in a sliding manner along the sliding unit enclosure, and a driving motor to actuate the sliding table;

wherein the driving motor is arranged side by side with the sliding unit enclosure and connected with the sliding unit enclosure through a drive train enclosure receiving therein a part of drive train to carry power from the driving motor to the sliding table, the drive train enclosure being made airtight and mounted with the driving motor while maintaining airtightness.

In one aspect of the present invention a sliding device is disclosed in which the sealing members are made of porous material rich in flexibility and restoration to its original state, and a leg extending through between the sealing members to the sliding table travels in a way exerting deformation of expansion/collapse on the sealing members with keeping close sliding-engagement with the sealing members, thereby keeping isolating inside the sliding unit enclosure at any given time.

In another aspect of the present invention, a sliding device is disclosed in which the sliding unit enclosure and the drive train enclosure are both made with communicating ports to allow air to flow in and out of the sliding unit enclosure through there, and the drive train enclosure is provided with an air port that serves for sucking air out of the sliding unit enclosure and the drive train enclosure or blowing fresh clean air into the sliding unit enclosure and the drive train enclosure.

In another aspect of the present invention, a sliding device is disclosed in which the drive train is comprised of a lead screw lying for rotation lengthwise along the sliding unit enclosure, a ball nut mating with the lead screw for linear movement along the lead screw and having the sliding table fastened thereto, a first pulley fastened to the lead screw, a second pulley connected to an output shaft of the driving motor, and an endless belt fit over the first and second pulleys, and the drive train enclosure shields only the first and second pulleys, and the endless belt in a airtight manner.

In another aspect of the present invention a sliding device is disclosed in which the drive train enclosure is made up of a case recessed to contain therein the first pulley, second pulley and the endless belt and a lid of sheet material to close the recessed case, and the drive train enclosure is fastened at one end thereof to the driving motor while at another end thereof to the sliding unit enclosure.

In a further another aspect of the present invention a sliding device is disclosed in which the drive train enclosure is connected to any one end of the sliding unit enclosure in such an arrangement that the driving motor lies on any one side of opposite sides of the sliding unit enclosure or underneath the sliding unit enclosure, with their communicating ports being brought into alignment with one another.

In another aspect of the present invention, a sliding device is disclosed in which the driving motor and the drive train enclosure are fastened to one another together with a belt tension adjuster that is interposed between the driving motor and the drive train enclosure. Moreover, the belt tension adjuster is comprised of an L-shape fitting fastened to the driving motor, and a screw mating a threaded hole in the L-shape fitting to change a distance between the first and second pulleys, thereby varying belt tightness.

In another aspect of the present invention, a sliding device is disclosed in which the slider fits in the guide rail, which also comprises the sliding unit enclosure, in a way moving by virtue of the rolling elements, while the guide rail is formed in a U-shaped shape in transverse section made up of a pair of lengthwise side walls and a bottom integral with the side walls, the bottom being provided with a mating surface that is used to fasten the sliding unit enclosure to any other object.

In another aspect of the present invention a sliding device is disclosed in which the sliding unit enclosure is made in airtight construction with combination of the guide rail of U-shape in transverse section, the covering members attached to the sides of the guide rail, one to each side, the sealing members fit in the covering members, and end plates attached to opposite ends of the sliding unit enclosure.

With the sliding device constructed as recited earlier, the drive train enclosure to join the sliding unit enclosure together with the driving motor may be made compact in construction, even with making ensure of high airtight that is able to achieve the class 2 in the classification of air cleanliness according to JIS B 9920 where the air cleanliness is expressed by the number of dust per square meter ($m^3$) in terms of dust size referred to the upper limit concentration (number of dust/$m^3$). The class 2 recited above means the number of dust particle is 100 particles of 0.1 μm, 24 particles of 0.2 μm, 10 particles of 0.3 μm, 4 particles of 0.5 μm, and no particle of not less than 1 μm. With the sliding device of the present invention, the air port to suck airborne dust out of the airtight enclosures is especially made in the drive train enclosure that is the area with the most possible risk of causing dust. The drive train enclosure is further made with some openings at different locations, while the sliding unit enclosure is made with a communicating port. The interiors of both the enclosures are made communicated with one another by bringing the communication port in the sliding unit enclosure into alignment with any suitable one opening made in the drive train enclosure. As a result, the sliding device provides a simple construction that makes it possible to evacuate air from both the enclosures at a suck or force air into both the enclosures at a blow through the air port. Moreover, the belt tension adjuster installed outside the drive train enclosure makes it possible to control the belt tightness of the endless belt installed inside of the drive train enclosure without breaking the airtightness inside the drive train enclosure.

The above and other related objects and features of the present invention will be more apparent to those skilled in the art from a reading of the following description of the disclosure found in the accompanying drawings and the novelty thereof pointed out in the appended claims.

BRIEF DESCRIPTION OF THE DRAWINGS

in FIG. 14(A) the motor is juxtaposed on one side of the sliding unit enclosure as illustrated in FIG. 1; in FIG. 14(B) the motor is juxtaposed on opposing side of the sliding unit enclosure in reverse with FIG. 14(A); and in FIG. 14(C) the motor is juxtaposed underneath the sliding unit enclosure.

DETAILED DESCRIPTION OF THE PREFERRED EMBODIMENTS

The sliding device of the present invention will be well used in not only a diversity of machinery including semiconductor manufacturing apparatus, machine tools, various assembling apparatus, precision testing/measuring instruments, position control tables, sliding tables and so on, which are needed to work in any controlled atmosphere including clean rooms, laboratories and the like, but also other types of machines that are expected to in reverse work in an environment contaminated with dust and dirt. The current sliding devices used in the advanced instruments installed in machinery operated in clean atmosphere are increasingly needed to match the working environment that detests causing any dust and dirt.

Referring now in detail to the accompanying drawings, a sliding unit having sealing means according to the present invention will be explained below.

A constructional feature of the sliding device of the present invention are envisaged operating on a diversity of machinery including semiconductor manufacturing apparatus, machine tools, various assembling apparatus, precision testing/measuring instruments, and so on, which are increasingly needed to work in clean environment. Another feature of the sliding device of the present invention resides in the airtight construction using the sealing construction for the sliding device disclosed in Japanese Patent Laid-Open No. 2003-222129, which is co-pending senior application of common assignment. Another feature of the sliding device of the present invention is directed at geometric construction making it possible to install the device in the site constrained in lengthwise axial dimension, with keeping air-tightness.

The sliding device constructed according to the present invention features the sealing construction reduced in axial length and ensured in airtightness that can realize the classification of air cleanliness, class 2 to be preferably used in the clean environment, even with compact in construction.

Figure 1:
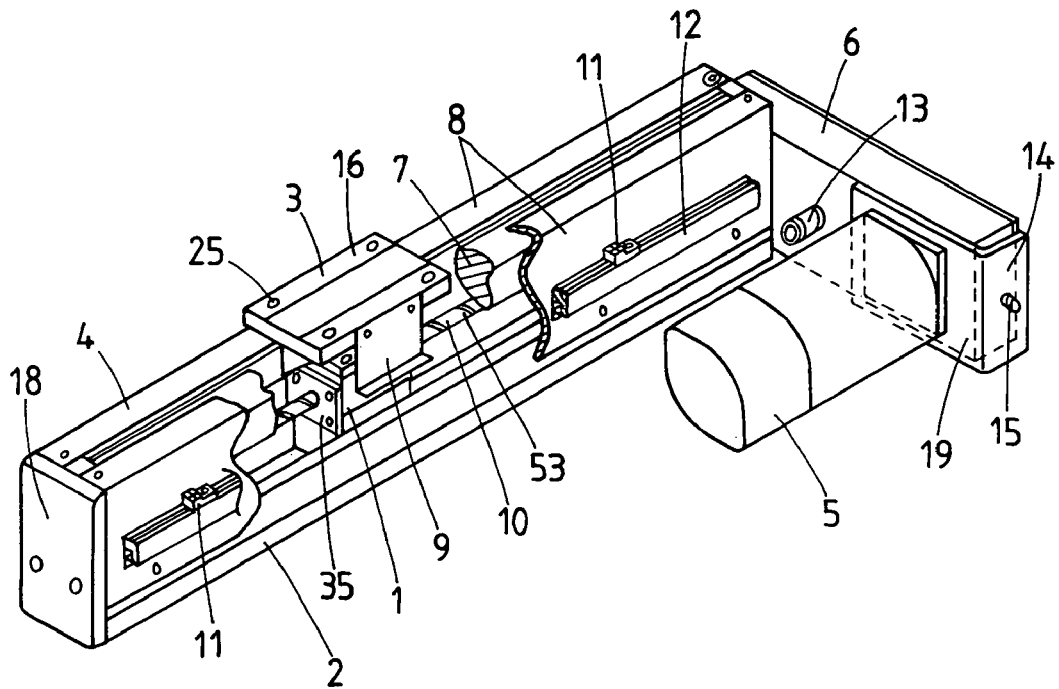
FIG. 1 is a partially cut away view in perspective of a preferred embodiment of a sliding device according to the present invention.
Figure 2:
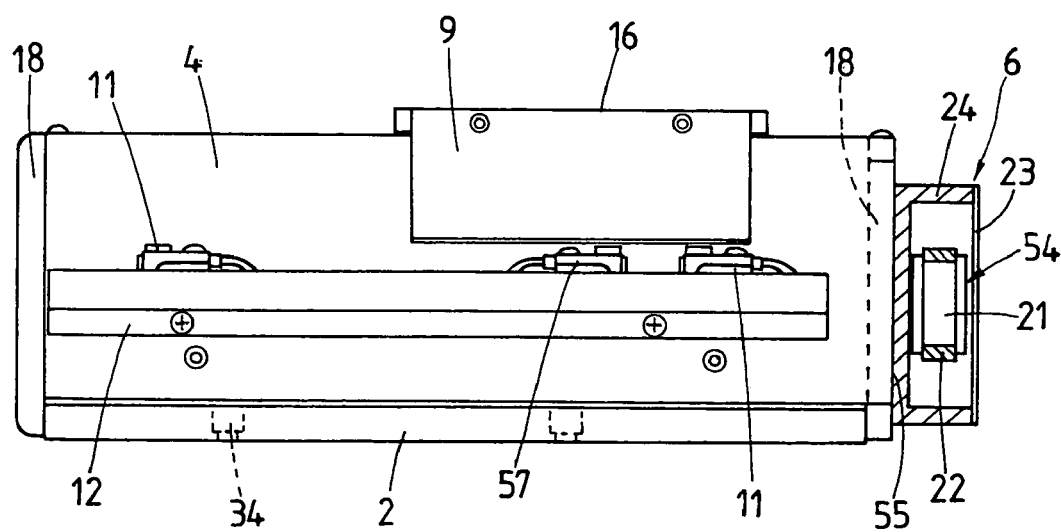
FIG. 2 is a view, partially in section, in front elevation of the sliding device shown in FIG. 1.

The sliding device of the present invention, as shown in FIG. 1, is constructed in a way a sliding unit enclosure 4 is side by side with a driving motor 5 in parallel one another. The sliding unit enclosure 4 is connected with the driving motor 5 through the drive train enclosure 6 fastened to any one end 55 of the sliding unit enclosure 4. The sliding device is generally comprised of the elongated sliding unit enclosure 4 kept in airtight using sealing members 7, a sliding table movable in the lengthwise direction of the sliding unit enclosure 4, and the driving motor 5 to actuate sliding mechanism in the sliding unit enclosure 4.

With the sliding device constructed according to the present invention, the sliding unit enclosure 4 of airtight construction accommodates therein a guide rail 2 made with bolt holes 34 used to fasten the sliding unit to any other object such as a machine bed or the like, and a slider 1 movable in a sliding manner relatively to the guide rail 2. The driving motor is made in an airtight construction while the drive train enclosure to hold the driving motor 5 in parallel with the sliding unit enclosure 4 and connect them with one another is also made in airtight construction. Thus, the sliding device is entirely encapsulated with the airtight construction. The drive train enclosure 6 receives therein a drive train 54 to carry power from an output shaft 26 of the driving motor 5 to a lead screw 53 that is carried for rotation in the sliding unit enclosure 4. The driving motor 5 is mounted on the outside of the sliding unit enclosure 4.

The sliding device constructed as stated earlier uses a ball-nut screw system 10 to force the sliding table 3 relative to the sliding unit enclosure 4 in a reciprocating manner. The ball-nut screw system 10 is composed of the lead screw 53 carried for rotation in the sliding unit enclosure 4, and a ball nut 35 mating with the lead screw 53 and fastened to the slider 1. The drive train enclosure 6 having therein the drive train 54 is arranged in a way extending sidewise form the sliding unit enclosure 4 and holding the driving motor 5 at the faraway end thereof in parallel with the sliding unit enclosure 4, thereby forming entirely an L-shape configuration.

The drive train enclosure 6 containing therein the drive train 54 is entirely made in the airtight construction, inclusive of the driving motor 5 mounted to outside thereof. The drive train enclosure 6 is provided with an air port 17 that serves for sucking air out of the sliding unit enclosure 4 and the drive train enclosure 6 or blowing fresh clean air into the sliding unit enclosure 4 and the drive train enclosure 6. The air port 17 is installed with a joint pipe 13 to connect an air tube to the air port 17.

With the sliding device constructed as stated earlier, the air port 17 is made in the drive train enclosure 6 that is the area with the most possible risk of causing dust. The drive train enclosure 6 is further made with some openings 27, 28 and 31 at different locations, while the sliding unit enclosure 4 is made with a communicating port 32. The interiors of both the enclosures 4 and 6 are made communicated with one another by bringing the communication port 32 in the sliding unit enclosure 4 into alignment with any suitable one opening 27, 28 or 31 determined depending on any selected geometric relation of the drive train enclosure 6 with the sliding unit enclosure 4.

It will be thus understood that the sliding device constructed as stated earlier makes it possible to evacuate air from both the enclosures 4 and 6 at a suck or force air into both the enclosures 4 and 6 at a blow through the air port 17.

The sliding unit enclosure 4 is composed of a covering members 8, sealing members 7 fit in the covering members 8, and end plates 18 fastened to axially opposite ends of them. The sealing members 7 are expected to keep the sliding unit enclosure 4 airtight and are composed of a pair of sealing foams 40 of cellular or porous material rich in flexibility as well as restoring ability to their initial shape. The airtight construction of the sliding unit enclosure 4 is established with the combination of the guide rail 2 of U-shape in transverse section, the covering members 8 attached to the sides 42 of the guide rail 2, one to each side, the sealing members 7 of sealing foam 40 fit in the covering members 8, one to each covering member, and the end plates 18 attached to the axially opposite ends of the sliding unit enclosure 4. The slider 1 that fits into the guide rail 2 for back-and-forth sliding movement includes the sliding table 3, which has a top surface 16 for carrying other instruments or workpiece thereon, and threaded holes 25 used to fasten the object to the top surface 16. A leg 39 for the sliding table 3 extends out of the sliding unit enclosure 4 through between the sidewise opposing sealing members 7. The leg 39 will travel in a way exerting the deformation of expansion/collapse on the sealing members 7 with keeping constantly close sliding-engagement with the sealing members 7.

The drive train 54 to carry power from the driving motor 5 to the sliding table 3 is involved with the lead screw 53 lying for rotation lengthwise along the guide rail 2 in the sliding unit enclosure 4, the ball nut 35 mating with the lead screw 53 for linear movement along the lead screw 53 and having the sliding table 3 fastened thereto, a first pulley 21 fastened to any one end of the lead screw 53, a second pulley 20 connected to the output shaft 26 of the driving motor 5, and an endless belt 22 fit over the first and second pulleys 20 and 21. Of the components of the drive train 54, only the first and second pulleys 20, 21 and the endless belt 22 are installed within the drive train enclosure 6.

The drive train enclosure 6 is fastened at one end thereof to the mating end 55 of the sliding unit enclosure 4 with using fastening screws 29 while at the other end thereof to the mating end 58 of the motor 5 through an L-shape fitting 19 with using any fastening screws. The drive train enclosure 6 is made up of a case 24 made to a recess 62 to embrace the pulleys 20, 21 and the endless belt 22 therein, and a lid 23 of thin sheet material to close the case 24 provided with the recess 62. The recessed case 24 includes a bottom 60 and a side wall 61 integral with the periphery of the bottom 60, the bottom 60 being made therein with the air port 17, openings 27, 28, 31 for allowing air to flow through there, a hole 43 for the lead screw 53, an elongated hole 44 for the output shaft 26 of the driving motor 5, and a knock hole 46 for positioning use. The side wall 61 of the recessed case 24 serves coming into abutment against a tip of an adjusting screw 15 driven through a threaded hole 51 in the L-shape fitting 19. The lid 23 is fastened to the recessed case 24 using fastening screws that are driven into threaded holes 45 of the recessed case 24 after passing through through-holes 47 in the lid 23. Thus, the drive train enclosure 6 encloses therein the drive train 54 composed of the pulleys 20, 21 and the endless belt 22.

Figure 14:
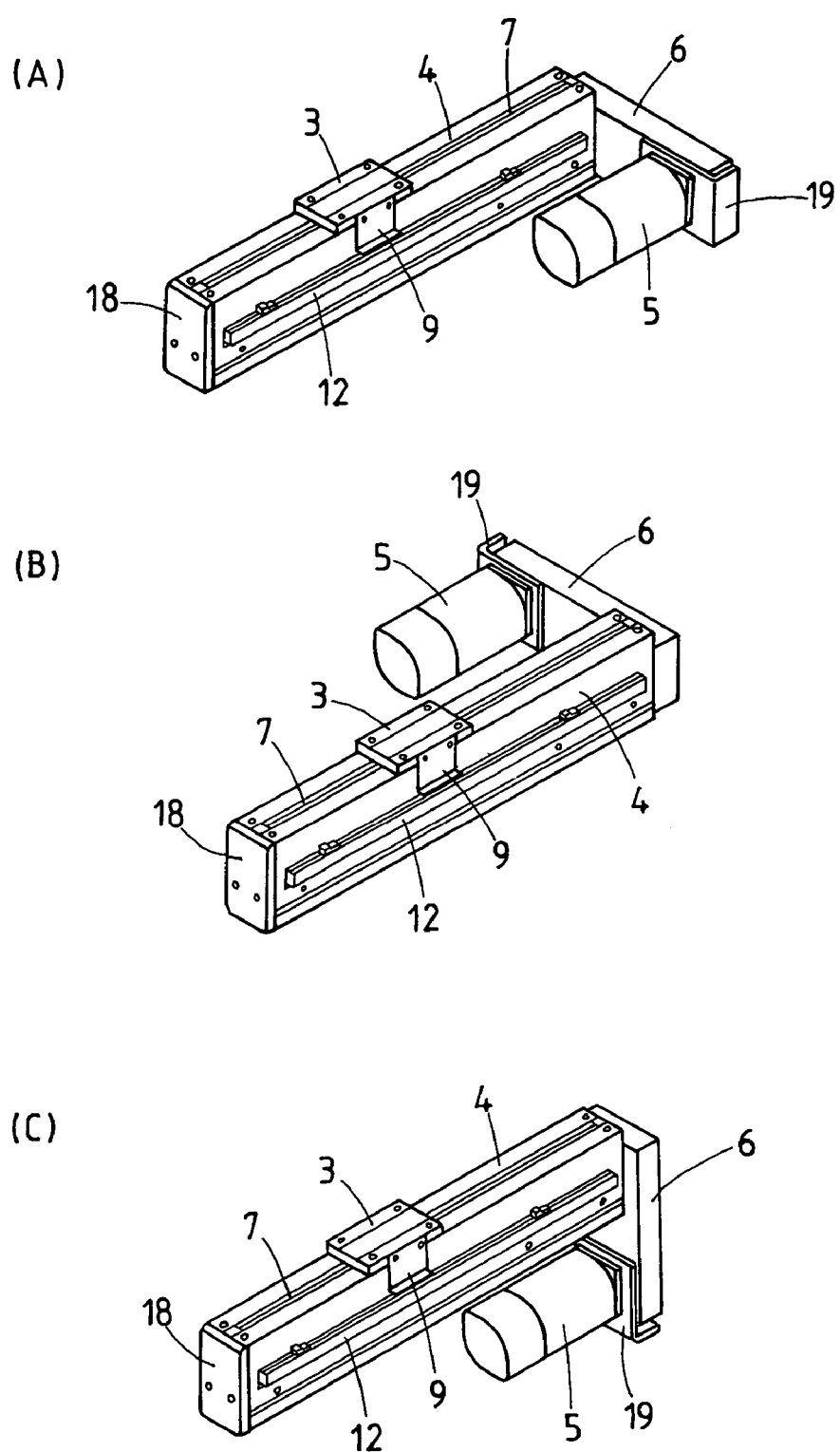
FIGS. 14(A), 14(B) and 14(C) are views in perspective of the sliding device of FIG. 1 where the driving motors are shown in different geometric relations with the sliding unit enclosure.

The drive train enclosure 6 is envisaged making it possible to join the driving motor 5 to the sliding unit enclosure 4 in any desired geometric relation with the sliding unit enclosure 4, whether horizontally parallel arrangement or vertically parallel arrangement. To this end, the recessed case 24 for the drive train enclosure 6 is made therein with plural openings 27, 28 and 31, which can be each brought into fluid-communication with the communicating port 32 in the sliding unit enclosure 4, depending on which geometrical arrangement is selected. Thus, the drive train enclosure 6 may be combined with the sliding unit enclosure 4 in any one geometrical relation of horizontal arrangement where the driving motor 5 lies on the left side of the sliding unit enclosure 4 as shown in FIG. 14(A) or on the right side as shown in FIG. 14(B) and vertical arrangement where the motor 5 lies underneath the sliding unit enclosure 4 as shown in FIG. 14(C).

Figure 5:
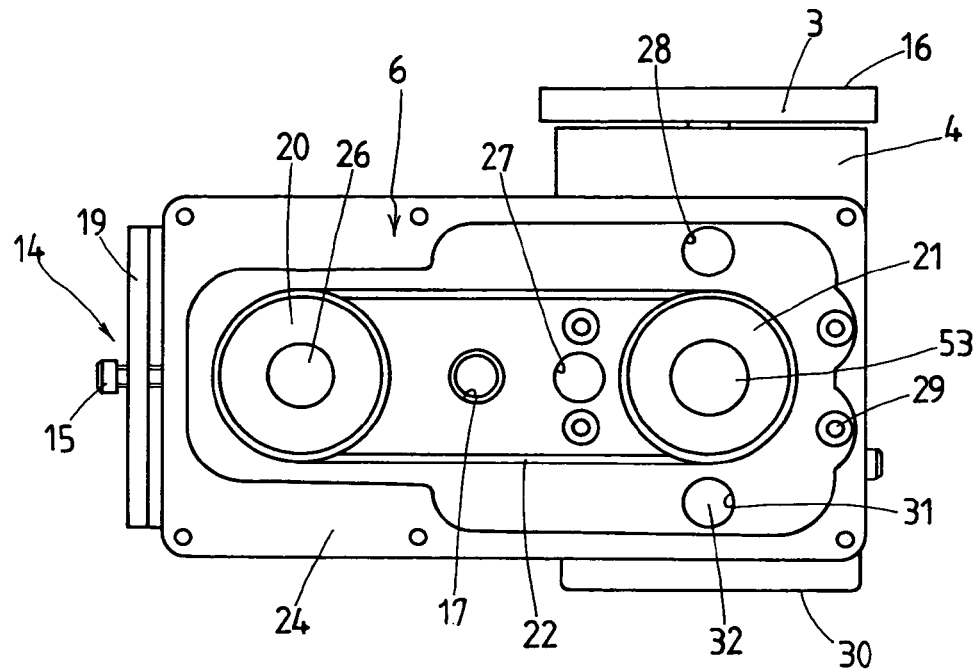
FIG. 5 is a view in side elevation of the sliding device of FIG. 4, but in which a covering lid is shown as being removed to look into the interior thereof.

With the sliding device constructed as stated earlier, the recessed case 24 for the drive train enclosure 4, as shown in FIGS. 5 and 7-9, is fastened on the bottom 60 thereof to the end plate 18 of the sliding unit enclosure 4 to make airtight engagement with one another, except an elongated hole 44 to allow the output shaft 26 of the driving motor 5 to pass through there, plural openings 27, 28 and 31 punched for allowing air to flow in and out of the sliding unit enclosure 4 through there, any one of which will match the communicating port 32 in the end plate 18 of the sliding unit enclosure 4. As seen in FIG. 5, the opening 27 in the recessed case 24 for the drive train enclosure 6 is angularly spaced away by 90 degrees from other openings 28, 31. On the geometrical arrangement where the motor 5 lies on the left side of the sliding unit enclosure 4, for example, the communication port 32 in the sliding unit enclosure 4 shown in FIG. 5 comes into alignment with only the opening 31 of the recessed case 24 to get the interiors of both the enclosures 4 and 6 opening each other while other openings 27 and 31 are closed with the end plate 18 of the sliding unit enclosure 4 in an airtight manner. The communicating port 32 of the sliding unit enclosure 4 is the equivalent to the opening in the sealing construction disclosed in Japanese Patent Laid-Open No. 2003-222129, which is co-pending senior application of common assignment.

A belt tension adjuster 14 is interposed between the driving motor 5 and the drive train enclosure 6 fastened to the motor 5. The belt tension adjuster 14 is placed outside the drive train enclosure 6 so as not to negatively affect the airtight mating of the sliding unit enclosure 4 with the drive train enclosure 6. With the belt tension adjuster 14 disposed as stated just above, the tension applied to the belt 22 may be controlled with neither getting the drive train enclosure 6 opening to the outside nor removing the lid 23 from the recessed case 24.

As seen in FIGS. 1, 3, 4, 5, 12 and 13, the belt tension adjuster 14 is comprised of the L-shape fitting 19 serving as the mating member with the driving motor 5, and the screw 15 to adjust the belt tension. The adjusting screw 15 fits into the L-shape fitting 19 with the tip thereof coming into abutment against the side wall 61 of the recessed case 24. Driving the adjusting screw 15 against the side wall 61 causes the L-shape fitting 19 to force backwards away from the drive train enclosure 6, moving the output shaft 26 of the driving motor 5 fastened to the L-shape fitting 19 to move the pulley 20 connected with the output shaft 26, thereby varying a distance between the pulleys 20 and 21 to correspondingly change the tightness of the belt 22.

Figure 9:
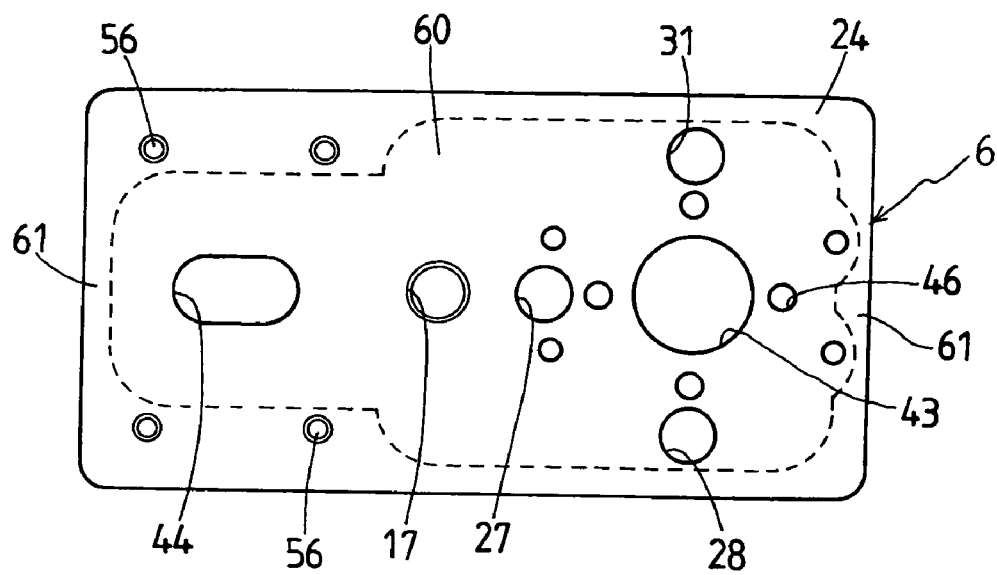
FIG. 9 is a view in rear elevation of the drive train enclosure shown in FIG. 7.
Figure 10:
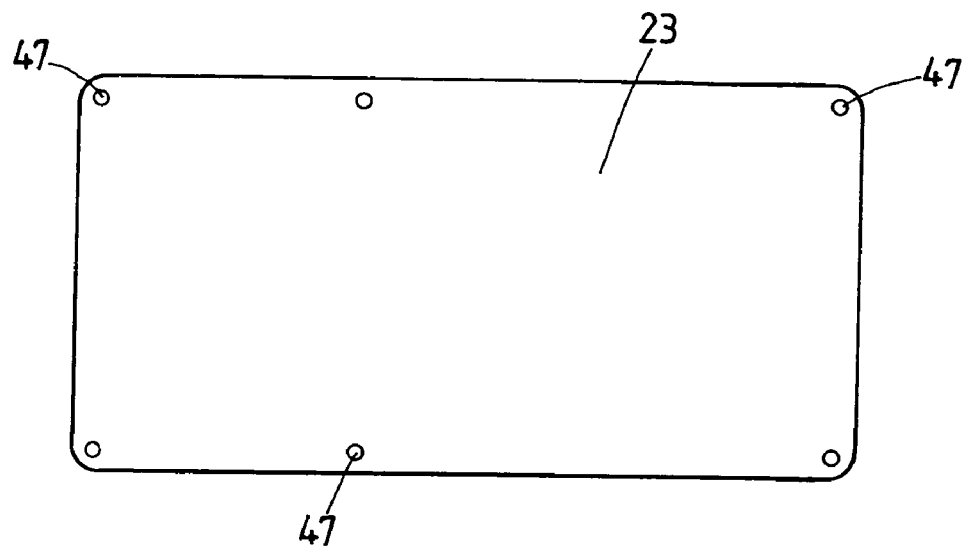
FIG. 10 is a view in front elevation of the covering lid applied to the drive train enclosure of the sliding device shown in FIG. 3.
Figure 11:
FIG. 11 is a plan view showing the covering lid of FIG. 10.
Figure 12:
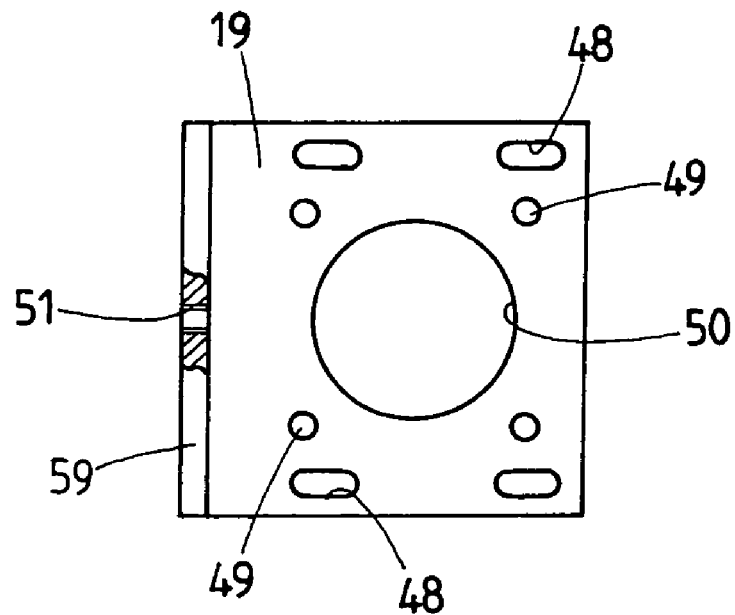
FIG. 12 is a partially broken away view in front elevation of an L-shape fitting for a belt tension adjuster incorporated in the sliding unit of FIG. 1.
Figure 13:
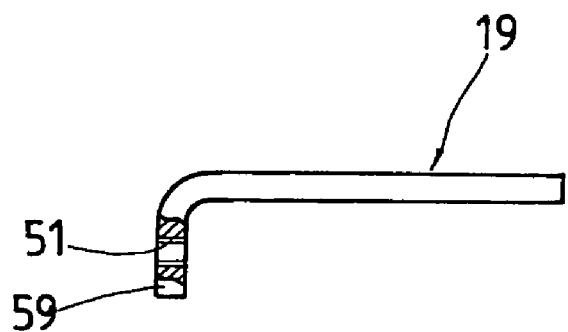
FIG. 13 is a plan view, partially broken away, of the L-shape fitting a view of FIG. 12.

The driving motor 5 is fastened to the L-shape fitting 19 using screws, not shown, which fit into matching holes 49 made in the L-shape fitting 19 as shown in FIG. 12. The L-shape fitting 19 together with the driving motor 5 is mounted on the recessed case 24 using fastening screws, which pass through elongated holes 48 in the L-shape fitting 19, followed by fitting into threaded holes 56 in the bottom 60 of the recessed case 24 as shown in FIG. 9. In a bent edge 59 of the L-shape fitting 19, there is provide a threaded hole 51 into which the adjusting screw 15 fits to determine the L-shape fitting 19 relative to the drive train enclosure 6, thereby controlling the tightness of the belt 22.

The slider 1 has end seals 36 on forward and aft ends thereof and fits in the guide rail 2 for sliding movement by virtue of more than one rolling element 33. The guide rail 2 that comprises the sliding unit enclosure 4 is formed in generally U-shaped shape in transverse section made up of a pair of lengthwise side walls 42 and a bottom 41 integral with the side walls 42. In the bottom 41 of the guide rail 2, there are provided a mating surface 30(FIG. 5) that is used to fasten the sliding unit enclosure 4 to any other object such as machine bed and so on. On any one of the forward and aft ends of the slider 1, there is provided the ball nut 35 that mates with the lead screw 53 carried for rotation in the sliding unit enclosure 4. Turning the lead screw 53 forces the ball nut 35 to move along the lead screw 53, thereby moving the slider 1 fastened to the ball nut 35.

Figure 3:
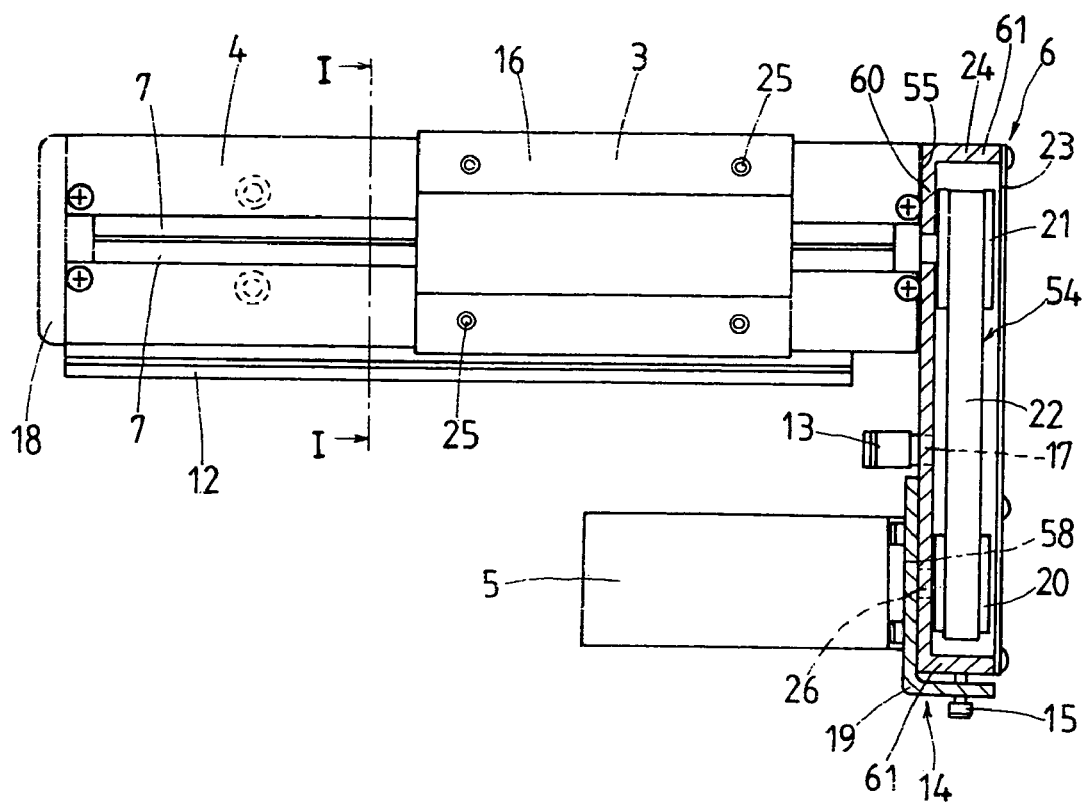
FIG. 3 is a plan view, partially in section, of the sliding device of FIG. 1.
Figure 4:
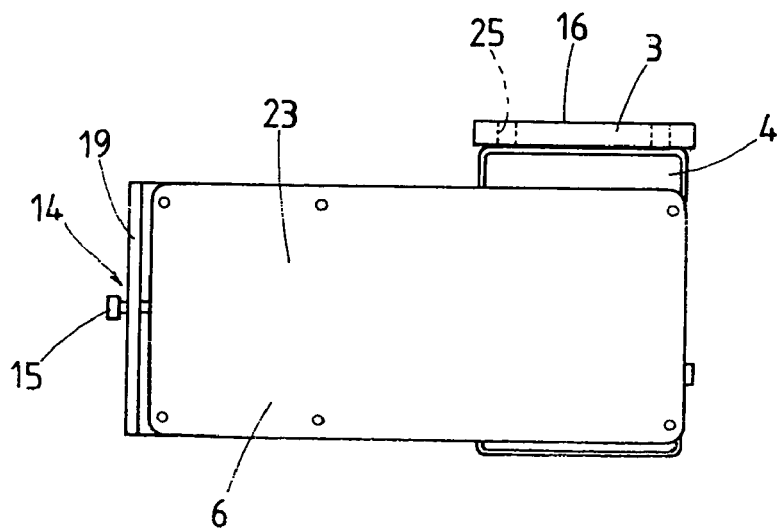
FIG. 4 is a view in side elevation of the sliding unit of FIG. 1.
Figure 6:
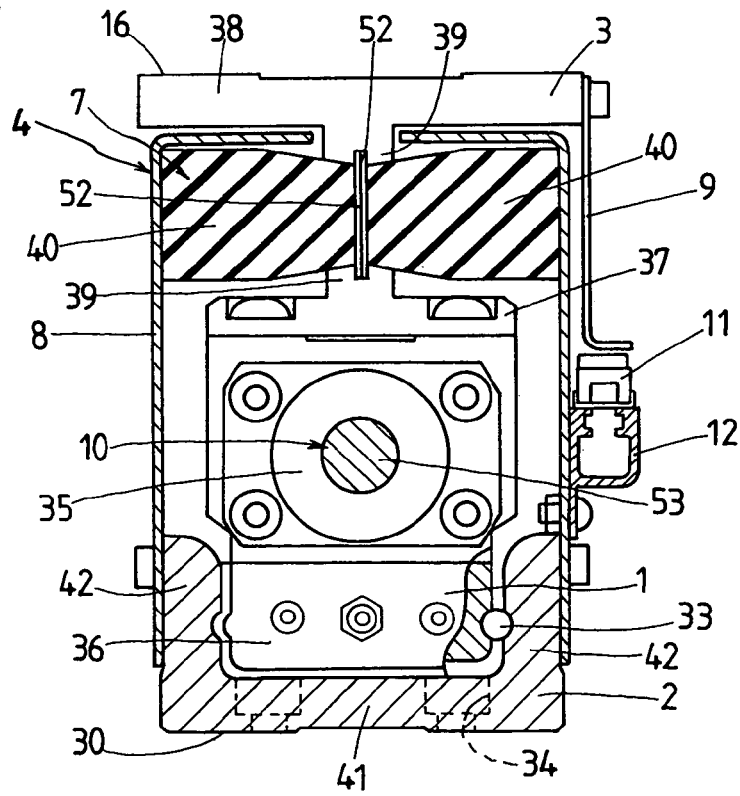
FIG. 6 is a view in transverse section of the sliding device, the view being taken on a plane of the line I-I of FIG. 3.
Figure 7:
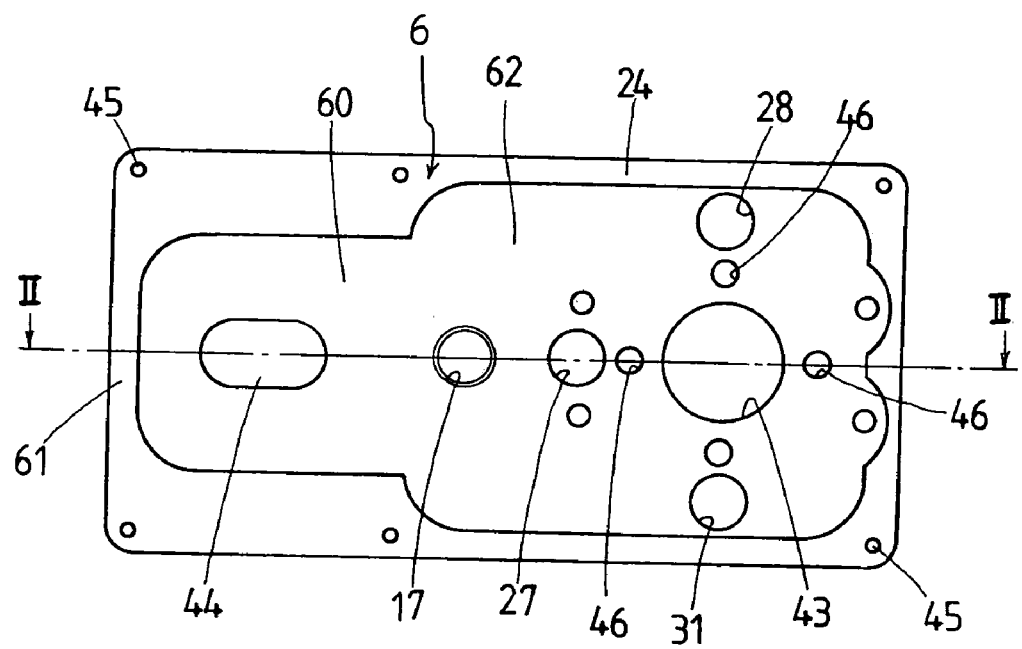
FIG. 7 is a view in front elevation of a drive train enclosure used in the sliding unit of FIG. 1.
Figure 8:
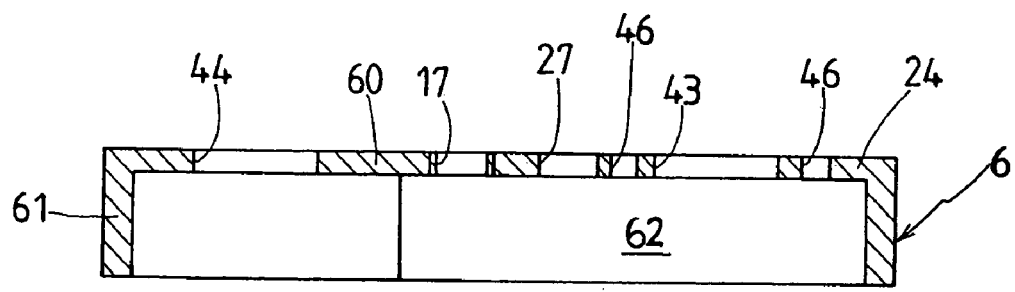
FIG. 8 is a view in transverse section of the drive train enclosure, the view being taken on a plane lying on the line II-II of FIG. 7.

The sliding table 3, as shown in FIGS. 3 and 6, is generally made in the form of I-shape in transverse section, which is comprised of a table 38 having the flat top surface 16 for carrying other instruments or workpiece thereon, a foot 37 to be fastened to the upper surface of the slider 1 using screws, and the leg 39 extending from the foot 37 towards outside the sliding unit enclosure 4 and joining integrally with the table 38. In the covering members 8 fastened to the side walls 42 using screws, one to each side wall 42, there are held the sealing members 7 of sealing foam 40 in opposition to one another. The sealing foams 40 have resilient members 52 on their front surfaces facing directly one another. Wear-proof members are further attached over the resilient members 52. As the slider 1 moves relatively to the guide rail 2 in a sliding manner, the leg 39 extending through between the opposing sealing foams 40 of the sealing members 7 to the sliding table 3 can travel in a way pushing the sealing foams 40 away from each other, with keeping constantly the close sliding-engagement with the sealing members 7. Thus, the sealing members 7 can experience deformation of expansion or collapse while keeping the inside the sliding unit enclosure 4 airtight. With the sliding device of the present invention, moreover, a sensor rail 12 as shown in FIGS. 1, 2, 3 and 6, is disposed on any one lengthwise side of the sliding unit enclosure 4. On the sensor rails 12 there are installed many sensors including a limit sensor 11, origin sensor 57, before-the-origin sensor, and so on, which are selected depending on the operational conditions. The slider 1 is provided on the side thereof with a dog 9 having a detector in opposition to the sensors 11, 57.

In assembling operation of the sliding unit enclosure 4 with the recessed case 24 for the drive train enclosure 6 to prepare the sliding device of airtight construction, the end of the lead screw 53 is first introduced into an hole 43 prepared for the lead screw 53. Then, the recessed case 24 is set in place by fit of knock pins of the sliding unit enclosure 4 into the knock holes 46 in the recessed case 24. Finally the recessed case 24 is fastened to the sliding unit enclosure 4 using screws. After fixture of the recessed case 24 to the sliding unit enclosure 4, the pulley 21 is connected to the end of the lead screw 53 while the pulley 20 is coupled to the end of the output shaft 26 of the driving motor 5. Then, the endless belt 22 fits over the first and second pulleys 20 and 21.

With sliding device of the present invention, moreover, the belt tension adjuster will be handled to maintain belt tension with most proper tension. To this end, after loosening the screw used to fasten the L-shape fitting 19, the adjusting screw 15 in the bent edge of the L-shape fitting 19 is manipulated to move the L-shape fitting 19, with keeping the tip thereof in abutment against the side wall of the recessed case 24, which is in opposition to the inside of the L-shape fitting 19, whereby the belt can be tightened with most appreciated tension.

For completion of the sliding unit constructed as stated earlier, specially, the output shaft 26 of the driving motor 5 is fit into an opening 50 prepared at the center of the L-shape fitting 19, while the screws are driven into the matching holes 49 in the L-shape fitting 19 to fasten the driving motor 5 on the L-shape fitting 19. Further, the L-shape fitting 19, after position control relative to the drive train enclosure 6, is fastened to the drive train enclosure 6 by tightening the fastening screws into elongated holes 48 in the L-shape fitting 19, whereby the driving motor 5 is mounted to the drive train enclosure 6.

With the sliding device constructed as stated earlier, the slider 1 fits in the guide rail 2, which also comprises the sliding unit enclosure 4, in a way moving by virtue of the rolling elements 33, while the guide rail 2 is formed in the U-shaped shape in transverse section made up of a pair of lengthwise side walls 42 and a bottom 41 integral with the side walls 42. In the bottom 41 of the guide rail 2, there are provided a mating surface 30 that is used to fasten the sliding unit enclosure 4 to any other object such as machine bed and so on. The constructional features recited just above helps increase stiffness and compactness of the sliding unit, thereby making sure of steady or stable connection of the sliding unit enclosure 4 with the drive train enclosure 6. The drive train enclosure 6 in itself is rendered simple in construction and, therefore, the sliding unit may be made entirely compact in construction and easy to handle it. The sliding device constructed according to the present invention was proved that the classification of air cleanliness of class 2 at average cleanliness was accomplished under the testing conditions: 3000 rpm (=1000 mm/sec.), stroke length=400 mm, and suction capacity=20 NL/min.

While the present invention has been disclosed in connection with the preferred embodiments thereof, it should be understood that other embodiments may be fall within the spirit and scope of the invention, as defined by the following claims.

What is claimed is:

1. A sliding device comprising:
   an elongated sliding unit enclosure made airtight with sealing members,
   a sliding table movable in a sliding manner along the sliding unit enclosure, and
   a driving motor to actuate the sliding table;
   wherein the driving motor is arranged side by side with the sliding unit enclosure and connected with the sliding unit enclosure through a drive train enclosure receiving therein a part of a drive train to carry power from the driving motor to the sliding table,
   wherein the sealing members are made of porous material which has flexibility and restoration to its original state, and a leg extending through between the sealing members to the sliding table, which travels in a way exerting deformation of expansion or collapse on the sealing members while keeping sliding-engagement with the sealing members to keep the sliding unit enclosure airtight at any given time,
   wherein the drive train is comprised of a lead screw mounted for rotation lengthwise along the sliding unit enclosure, a ball nut mating with the lead screw for linear movement along the lead screw and having the sliding table fastened thereto, a first pulley fastened to the lead screw, a second pulley connected to an output shaft of the driving motor, and an endless belt fit over the first and second pulleys,
   wherein the drive train enclosure has a case fastened to any one end of the sliding unit enclosure and recessed to contain therein the first pulley, second pulley and the endless belt, and a lid of sheet material to close the recessed case,
   wherein the recessed case has a plurality of communicating ports which are in such an arrangement that any one of the communicating ports is brought into alignment with a communicating port of the sliding unit enclosure to allow air to flow in and out of the sliding unit enclosure while the drive train enclosure lies on any one side of opposite sides of the sliding unit enclosure or underneath the sliding unit enclosure, and
   wherein the recessed case has an air port that serves for sucking air out of the sliding unit enclosure and the drive train enclosure or blowing fresh clean air into the sliding unit enclosure and the drive train enclosure.

* * * * *